UNITED STATES PATENT OFFICE.

MILO W. MOORE, OF BOISE, IDAHO.

WALL-COATING COMPOSITION.

1,217,331.     Specification of Letters Patent.     Patented Feb. 27, 1917.

No Drawing.     Application filed June 19, 1916. Serial No. 104,514.

*To all whom it may concern:*

Be it known that I, MILO W. MOORE, a citizen of the United States, residing at Boise, in the county of Ada and State of Idaho, have invented certain new and useful Improvements in Wall-Coating Compositions, of which the following is a specification.

This invention relates to an improved sizing composition for cleaning and preparing walls prior to tinting the same, and has for its primary object to provide a simple and inexpensive combination of ingredients which will effectively remove all spots or discolorations in the surface of the plaster caused by creosote from leaking stove pipes, water stains due to roof leakages, and superficial discolorations due to various other causes.

It is another important object of the invention to produce a composition for the above purpose, which may be easily applied and, after its application, will dry in a relatively short time and leave a perfectly clean wall surface for the application of the tinting color thereto.

With the above and other objects in view, the invention consists in the following named ingredients mixed together substantially in the proportions specified:

Portland cement _____ 100 parts
Muresco (consisting of whiting,
   hydrous aluminum silicate, and
   powdered glue) _____ 25 parts
Powdered glue _____ 6¼ parts These materials are thoroughly mixed together in dry, powdered form, and when used, lukewarm water is added so as to produce a fluid mixture of any desired thickness as may be best adapted for the particular circumstances encountered. The composition is applied with a brush to the wall surface, and may either be used only upon the spots or discolorations, or may be applied to the entire surface of the wall as a sizing. The Portland cement constitutes a body or vehicle and also obliterates the stain in the wall surface, while the Muresco improves the quality of the body and opens the pores of the plaster so that the cement may enter the same. Muresco may be obtained in various colors, and in mixing the materials the proper color of Muresco is used in accordance with the color of the tinting material to be applied to the wall, so that the stain or spot will be more effectively obliterated. The powdered glue is used for the purpose of causing the composition to adhere to the plaster.

From the foregoing description, the manner of preparing my improved calcimining or sizing composition will be clearly and fully understood. The several ingredients employed may be obtained at small cost so that the composition can be inexpensively produced. The composition may be used either upon new, plastered walls or on walls that have been tinted a number of times. I have found in practice that it requires about one hour after application for the composition to dry and set. The tinting or coloring liquid should not be applied until the sizing composition has become thoroughly dry.

Having thus fully described my invention, what I desire to claim and secure by Letters Patent is:—

1. The herein described wall coating composition consisting of Portland cement, hydrous aluminum silicate, whiting, and an adhesive.

2. The herein described wall coating composition consisting of the following ingredients mixed together in substantially the proportions specified: Portland cement, 100 parts; the commercial compound Muresco, containing whiting, hydrous aluminum silicate and powdered glue, 25 parts; and powdered glue, 6¼ parts.

In testimony whereof I hereunto affix my signature in the presence of two witnesses.

MILO W. MOORE.

Witnesses:
   GEORGE H. RUST,
   H. G. PATTERSON.

Copies of this patent may be obtained for five cents each, by addressing the "Commissioner of Patents, Washington, D. C."